Inventors:
Leon J. Barrett
Norman F. Holter,
By
Omer W. Kennedy
Attorney

Patented Oct. 17, 1933

1,930,706

UNITED STATES PATENT OFFICE 1,930,706

COVER LOCKING DEVICE FOR CENTRIFUGAL MACHINES

Leon J. Barrett and Norman F. Holter, Worcester, Mass.; said Holter assignor to said Leon J. Barrett Application July 28, 1930. Serial No. 471,263

6 Claims. (Cl. 210—63)

The present invention relates to centrifugal machines of the type characterized by the provision of a rotatable container adapted to be driven at a high rate of speed so that the centrifugal force developed by rotation of the container will cause the circulation of air or liquid through articles within the container for the purpose of washing, coating, or drying the same.

The object of the invention is to provide the article container of a centrifugal machine with a cover that is adapted to be securely locked in position on the container so that there will be no possibility of the cover becoming loose while the container is rotating at high speed. The improved cover and locking device is so constructed that it may be locked, or unlocked, by simple operation conveniently performed by a user of the centrifugal machine. The locking device is also constructed so that the stationary casing of the centrifugal machine in which the container is placed cannot be closed unless the container cover has been properly locked in position, thereby preventing operation of the machine with an unsecured container cover. The above and other advantageous features of the invention will hereinafter more fully appear with reference to the accompanying drawing in which—

Like reference characters refer to like parts throughout the drawing.

Figure 1:
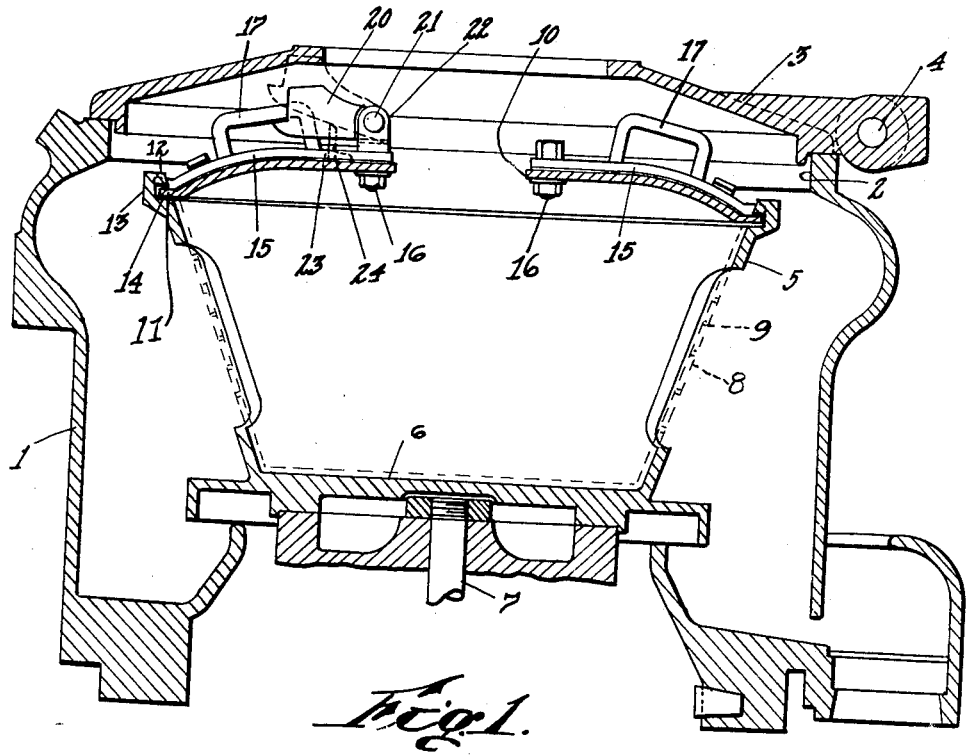
Fig. 1 is a vertical sectional view of a portion of a centrifugal machine embodying the invention.

Referring first to Fig. 1, the invention is shown for purposes of illustration in connection with a centrifugal machine of the type shown and described in the co-pending application of George E. Garno and Leon J. Barrett identified as Serial No. 472988 filed August 4, 1930 although it is obvious that the invention may be used in connection with other types of centrifugal machines. As shown, the machine comprises a generally cylindrical casing 1 providing a circular opening 2 adapted to be closed by a top 3 mounted on a hinge pin 4. A hollow bowl 5 is rotatably supported within the casing 1 with the base 6 of the bowl connected to a vertical shaft 7 that may be rotatably driven in any suitable manner, as by means of an electric motor connected directly to the shaft 7. The flaring walls of the bowl 5 are adapted to receive and support an article container 8 providing wall perforations 9, so that when the bowl 5 is rotated at high speed centrifugal action will tend to expel moisture from any articles in the container 8 and cause the circulation of air therethrough.

Figure 2:
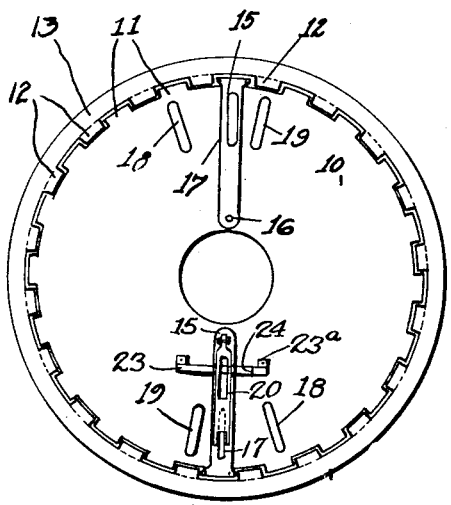
Fig. 2 is a plan view showing the container cover in unlocked position.
Figure 3:
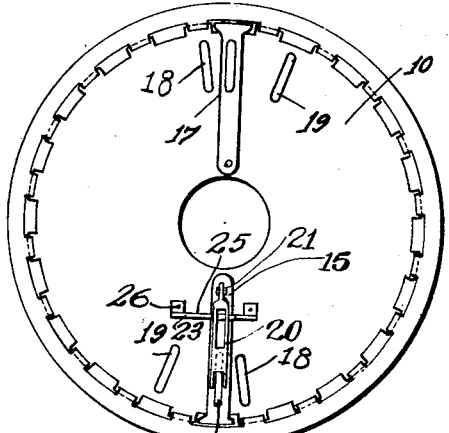
Fig. 3 is a plan view showing the container cover in a locked position.

The opening 2 of the casing 1 is of such diameter as to permit the article container 8 to be positioned in the bowl 5 when the casing top 3 is turned back, and the present invention contemplates the provision of a cover 10 for the bowl 5 that will hold the container 8 securely in position within the bowl 5, so that no articles can get out of the container. As shown in Fig. 2, the cover 10 is circular in form and its outer periphery is provided with a series of spaced teeth 11 corresponding in number and in spacing to a series of lugs 12 projecting inwardly from a circular rim 13 at the top of the bowl 5. It will also be noted in Fig. 2 that the spacing between adjacent bowl lugs 12 is slightly greater than the width of each tooth 11, so that the cover 10 may be placed in position on the bowl 5 with the teeth 11 freely received between the lugs 12. It will also be noted in Fig. 1 that the distance between the overhanging lugs 12 and the annular seat 14 on which the cover 10 is supported is slightly greater than the thickness of the cover teeth 11, so that the entire cover 10 may be rotated with respect to the bowl 5 in order to bring the teeth 11 into register with the lugs 12, as indicated in Fig. 3, in which position the cover 10 is adapted to be locked.

As best shown in Fig. 1, the cover 10 carries a pair of diametrically opposed locking arms 15, 15 each of which is pivotally mounted on a stud 16 for turning movement on the cover 10, about a vertical axis. The free end of each arm 15 is slightly wider than a tooth 11, as shown in Fig. 2, so that when the cover 10 is initially placed in position on the bowl 5, the arms 15 fit closely between adjacent lugs 12, and turning of the arms 15 is prevented. Each arm 15 carries a handle 17 that is disposed between a pair of handles 18 and 19 carried by the cover 10, and these handles provide means for conveniently turning the cover 10 to lock, or unlock, the same.

When the cover 10 is placed in position on the bowl 5 with its teeth 11 received between the lugs 12, the handles 18 are spaced from the handles 17 on the locking levers 15. Consequently, when the operator of the machine seizes both pairs of handles 17 and 18 and squeezes them together, the cover 10 will be turned bodily, since the arms 15 are then locked against turning movement. This turning of the cover 10 serves to bring all of the teeth 11 into position beneath the lugs 12, so that the cover 10 is securely held in position on the bowl 5, the parts then appearing as shown in Fig. 3. When it is desired to remove the cover 10, the two pairs of handles 17 and 19 are squeezed together, thereby turning the cover 10 in the opposite direction to disengage the teeth 11 from the lugs 12, the parts then appearing as shown in Fig. 2.

Figure 4:
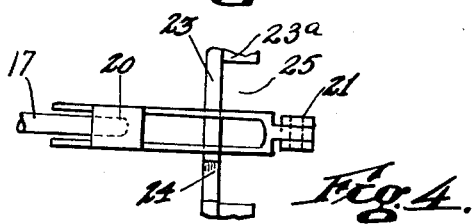
Fig. 4 is a fragmentary plan view showing the functioning of the safety latch employed in connection with the cover.

In order to positively lock the cover 10 so as to prevent its rotation after the teeth 11 have been registered with the lugs 12, one arm 15 carries a safety latch 20 pivotally mounted on a pin 21 carried by a head 22 provided by one of the pivot studs 16. The cover 10 carries a short section of angle iron which forms a locking bar 23 extending beneath the latch 20, and when the cover 10 is unlocked the latch 20 rides on the bar 23, as indicated in full lines in Fig. 4 and in dotted lines in Fig. 1. The horizontal flange 23a of the bar 23 is cut away as indicated at 25 in Figs. 3 and 4 to permit the arm 15 to slide beneath said bar, the latter being secured to the cover by rivets 26 extending through opposite ends of the bar. However, when the cover 10 is turned by squeezing the handles 17 and 18 to bring the teeth 11 and lugs 12 into registering relation, the latch 20 drops into a notch 24 provided on the bar 23, as indicated in full lines in Fig. 1. When the latch 20 is so received by the bar 23 it is impossible to turn the cover 10 by squeezing the handles 17 and 19, since the latch 20 then prevents relative movement between the cover 10 and the arm 15 which is in turn locked against pivotal movement by its engagement between adjacent lugs 12. When it is desired to unlock the cover 10, the latch 20 is lifted, so that squeezing the handles 17 and 19 together will impart angular movement to the cover and cause the same to be moved into the unlocked position of Fig. 2.

As previously pointed out, the latch 20 occupies the dotted line position in Fig. 1 when the cover 10 is unlocked and it will remain in this position until the cover has been turned far enough to permit the latch 20 to drop into the notch 24 on the bar 23. Since the dotted line position of the latch 20 is above the line of the closed lid 3 of the casing 1, it is evident that it will be impossible to entirely close the lid 3, as long as the latch 20 remains in its raised position. Therefore the latch 20 functions in the nature of a safety device, because unless the container cover 10 is securely locked to permit the latch 20 to fall, the attention of the machine operator will be directed to this condition by his inability to close the lid 3. Obviously this prevents operation of the machine with a loose cover 10 which might result in injury to the machine operator by the expulsion of articles therefrom due to centrifugal force.

We claim,

1. In a machine of the class described, the combination with a hollow casing providing a movable lid, a hollow bowl rotatably mounted within said casing and a removable cover for said bowl, of means for locking and unlocking said bowl cover by turning movement of said cover, and a latch carried by said cover to maintain said cover in locked position, and means cooperating with said latch to maintain said latch in a position to obstruct the closing movement of the lid of said casing when said cover is unlocked, said means being inoperative when said cover is in locked position.

2. In a machine of the class described, the combination with a hollow casing providing a movable lid, a hollow bowl rotatably mounted within said casing and a removable cover for said bowl, of means for locking and unlocking said cover with respect to said bowl by turning movement of said cover, and a latch pivotally mounted on said cover to maintain said cover in locked position, and means to maintain said latch in a raised position to obstruct the closing movement of the lid for said casing when said cover is in an unlocked position, said last means being inoperative when said cover is locked in closed position.

3. In a machine of the class described, the combination with a hollow casing providing a movable lid, a hollow bowl rotatably mounted within said casing and an article container receivable in said bowl, of a movable cover for said container, locking means for said cover, and means associated with said locking means to support the latter in position to engage with and to obstruct the closure of the lid for said casing when said cover is unlocked.

4. In a machine of the class described, the combination with a hollow casing providing a movable lid, a hollow bowl rotatably mounted within said casing, and an article container receivable in said bowl, of a movable cover for said container, locking means cooperating with said bowl, to maintain said cover in closed position, and means associated with said locking means to maintain the latter in position to obstruct closure movement of the lid for said casing when said cover is unlocked, said last-mentioned means being inoperative when said cover is locked.

5. In a machine of the class described, the combination with a rotatably mounted bowl and a removable container adapted to be seated in said bowl with the upper rim of said container below the rim of said bowl, of a removable cover for said bowl and said container, a plurality of spaced teeth around the periphery of said cover, correspondingly spaced projections on said bowl, with the inner ends of said projections spaced from the center of the bowl a greater distance than the radius of the removable container, said teeth being turned into locking engagement with said spaced projections by a relative turning movement of said bowl and cover.

6. In a machine of the class described, the combination with a rotatably mounted bowl and a removable container adapted to be seated in said bowl with the upper rim of said container below the rim of said bowl, of a removable cover for said bowl and said container, a plurality of spaced radially projecting teeth provided around the periphery of said cup, correspondingly spaced lugs projecting inwardly from the rim of said bowl with the inner ends of said lugs spaced from the center of said bowl a greater distance than the radius of the container within the bowl, means for turning said cover relative to said bowl to bring said teeth and lugs in overlapping relation with the teeth on said cover beneath the lugs on said bowl, and means cooperating with said turning means for positively locking said cover against turning movement when said teeth and lugs are in overlying relation.

LEON J. BARRETT.
NORMAN F. HOLTER.